United States Patent
Farah et al.

(10) Patent No.: US 10,100,676 B2
(45) Date of Patent: Oct. 16, 2018

(54) INTERGRATED SEAL SUPPORTS

(71) Applicant: United Technologies Corporation, Farmington, CT (US)

(72) Inventors: Jorge I. Farah, Hartford, CT (US); Christopher Treat, Manchester, CT (US); Jenny Chan, Portsmouth, NH (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 279 days.

(21) Appl. No.: 14/972,360

(22) Filed: Dec. 17, 2015

(65) Prior Publication Data

US 2016/0177788 A1   Jun. 23, 2016

Related U.S. Application Data

(60) Provisional application No. 62/093,247, filed on Dec. 17, 2014.

(51) Int. Cl.
*F01D 25/24* (2006.01)
*B22D 25/02* (2006.01)
(Continued)

(52) U.S. Cl.
CPC ........... *F01D 25/243* (2013.01); *B22D 25/02* (2013.01); *F01D 9/065* (2013.01); *F01D 25/162* (2013.01); *F01D 25/24* (2013.01); *F01D 25/28* (2013.01); *F05D 2220/32* (2013.01); *F05D 2230/21* (2013.01); *F05D 2230/25* (2013.01); *F05D 2260/941* (2013.01); *Y02T 50/671* (2013.01)

(58) Field of Classification Search
CPC ........ F01D 9/065; F01D 25/162; F01D 25/24; F01D 25/243; F01D 25/28; B22D 25/02; F05D 2220/32; F05D 2230/21; F05D 2230/25; F05D 2260/941; Y02T 50/671
See application file for complete search history.

(56) References Cited

U.S. PATENT DOCUMENTS

| | | | |
|---|---|---|---|
| 2010/0132369 A1* | 6/2010 | Durocher | F01D 9/065 60/796 |
| 2010/0132371 A1* | 6/2010 | Durocher | F01D 9/065 60/796 |

(Continued)

FOREIGN PATENT DOCUMENTS

| | | |
|---|---|---|
| EP | 2192270 A2 | 6/2010 |
| EP | 2192275 A2 | 6/2010 |

(Continued)

OTHER PUBLICATIONS

EPSR for EP Application No. 15200748.0, dated Jun. 7, 2016, 7 pages.

*Primary Examiner* — Igor Kershteyn
(74) *Attorney, Agent, or Firm* — Cantor Colburn LLP (57) ABSTRACT

An inner case for a gas turbine engine includes a case body defining a centerline axis. The case body includes a turbine seal support, and an I-rod support downstream of the turbine seal support. A mid-turbine frame for a gas turbine engine includes an inner case having an integral case body. A method for manufacturing an inner case for a turbomachine with an integral high pressure turbine seal support includes fabricating a case body.

16 Claims, 6 Drawing Sheets

(51) Int. Cl.
*F01D 25/28* (2006.01)
*F01D 9/06* (2006.01)
*F01D 25/16* (2006.01)

(56) References Cited

U.S. PATENT DOCUMENTS

| | | | | |
|---|---|---|---|---|
| 2010/0135770 A1* | 6/2010 | Durocher | ............... | F01D 9/065 |
| | | | | 415/69 |
| 2010/0303608 A1* | 12/2010 | Kataoka | ............... | F01D 25/162 |
| | | | | 415/68 |
| 2013/0078080 A1* | 3/2013 | Durocher | .............. | F01D 25/125 |
| | | | | 415/110 |

FOREIGN PATENT DOCUMENTS

| | | | |
|---|---|---|---|
| EP | 2573329 | A2 | 3/2013 |
| WO | 2014011978 | A1 | 1/2014 |
| WO | 2014052007 | A1 | 4/2014 |

* cited by examiner

PRIOR ART

INTERGRATED SEAL SUPPORTS

CROSS REFERENCE TO RELATED APPLICATIONS

This application claims the benefit of U.S. Provisional Patent Application 62/093,247 filed on Dec. 17, 2014, the entire contents of which are incorporated herein by reference thereto.

BACKGROUND

1. Field

The present disclosure relates to mid-turbine frames, such as in gas turbine engines.

2. Description of Related Art

Traditionally, a mid-turbine frame of a gas turbine engine includes an inner case and a turbine seal support, for example a high-pressure turbine (HPT) seal support. The mid-turbine frame is generally disposed between two turbines, such as the HPT and the low pressure turbine (LPT). The inner case and HPT seal support are generally joined together with bolted flange joints, e.g. a bolt goes through the thickness of a flange of the HPT seal support and a flange of the inner case, joining them together. Care in assembly and regular maintenance can be required because each bolted flange joint may be a source of leakage.

Such conventional methods and systems have generally been considered satisfactory for their intended purpose. However, there is still a need in the art for an improved mid-turbine frame. The present disclosure provides a solution for this need.

SUMMARY OF THE DISCLOSURE

An inner case for a gas turbine engine includes a case body defining a centerline axis. The case body includes a turbine seal support, and an I-rod support downstream of the turbine seal support.

The case body can include a meshing bulb radially outboard from the turbine seal support with respect to the centerline axis. The case body can include a gusset between the meshing bulb and the I-rod support. The gusset can be one of a plurality of circumferentially spaced apart gussets axially defined between the meshing bulb and the I-rod support. The case body can be a single integral piece, and/or can be manufactured by casting the case body as a single integral piece using a single casting mold.

The case body can include an uninterrupted outboard flange connecting the meshing bulb and the I-rod support. The uninterrupted outboard flange can be radially outboard from the turbine seal support. A load path can be defined through the meshing bulb, the uninterrupted outboard flange, and the I-rod support. The uninterrupted outboard flange can be frustoconical and can diverge in a direction away from the turbine seal support. The case body can include an uninterrupted inboard flange connecting the turbine seal support and the I-rod support, wherein the uninterrupted inboard flange is radially inboard from the I-rod support. The uninterrupted outboard and inboard flanges can be a single-ply of material. The uninterrupted inboard flange can be frustoconical and can diverge in a direction away from the turbine seal support. The turbine seal support can be a high pressure turbine (HPT) seal support. A mid-turbine frame for a gas turbine engine includes an inner case having an integral case body as described above.

A method for manufacturing an inner case for a turbomachine includes fabricating a case body, such as the case body described above. Fabricating the case body can include casting the case body using a single casting mold to cast the case body as a single integral piece, and/or machining the case body from a forging, for example a single forging, to machine the case body as a single integral piece.

In one embodiment, an inner case for a gas turbine engine is provided. The inner case having: a case body defining a centerline axis including: a turbine seal support; and an I-rod support downstream of the turbine seal support.

In addition to one or more of the features described above, or as an alternative to any of the foregoing embodiments, the case body includes a meshing bulb radially outboard from the turbine seal support with respect to the centerline axis.

In addition to one or more of the features described above, or as an alternative to any of the foregoing embodiments, the case body includes a gusset between the meshing bulb and the I-rod support.

In addition to one or more of the features described above, or as an alternative to any of the foregoing embodiments, the case body includes a plurality of circumferentially spaced apart gussets axially defined between the meshing bulb and the I-rod support.

In addition to one or more of the features described above, or as an alternative to any of the foregoing embodiments, the case body includes an uninterrupted outboard flange connecting the meshing bulb and the I-rod support, wherein the uninterrupted outboard flange is radially outboard from the turbine seal support, and wherein a load path is defined through the meshing bulb, the uninterrupted outboard flange, and the I-rod support.

In addition to one or more of the features described above, or as an alternative to any of the foregoing embodiments, the uninterrupted outboard flange is a single-ply of material.

In addition to one or more of the features described above, or as an alternative to any of the foregoing embodiments, the case body includes an uninterrupted outboard frustoconical flange connecting the meshing bulb and the I-rod support, wherein the uninterrupted outboard frustoconical flange diverges in a direction away from the turbine seal support.

In addition to one or more of the features described above, or as an alternative to any of the foregoing embodiments, the case body includes an uninterrupted inboard flange connecting the turbine seal support and the I-rod support, wherein the uninterrupted inboard flange is radially inboard from the I-rod support.

In addition to one or more of the features described above, or as an alternative to any of the foregoing embodiments, the uninterrupted inboard flange is a single-ply of material.

In addition to one or more of the features described above, or as an alternative to any of the foregoing embodiments, the case body includes an uninterrupted inboard frustoconical flange connecting the turbine seal support and the I-rod support, wherein the uninterrupted inboard frustoconical flange diverges in a direction away from the turbine seal support.

In addition to one or more of the features described above, or as an alternative to any of the foregoing embodiments, the case body is a single integral piece.

In addition to one or more of the features described above, or as an alternative to any of the foregoing embodiments, the case body is manufactured by casting the case body as a single integral piece using a single casting mold.

In addition to one or more of the features described above, or as an alternative to any of the foregoing embodiments, the turbine seal support is a high pressure turbine seal support. In yet another embodiment, a mid-turbine frame for a gas turbine engine is provided.

The frame having: an inner case having an integral case body defining a centerline axis, the case body including: a turbine seal support; and an I-rod support downstream of the turbine seal support.

In addition to one or more of the features described above, or as an alternative to any of the foregoing embodiments, further embodiment include a meshing bulb radially outboard from the turbine seal support with respect to the centerline axis.

In addition to one or more of the features described above, or as an alternative to any of the foregoing embodiments, the case body is manufactured by casting the case body as a single integral piece using a single casting mold.

In yet another embodiment, a method for manufacturing an inner case for a turbomachine with an integral high pressure turbine (HPT) seal support is provided. The method including the steps of: fabricating a case body defining a centerline axis, wherein the case body includes: a HPT seal support; and an I-rod support downstream of the HPT seal support.

In addition to one or more of the features described above, or as an alternative to any of the foregoing embodiments, the case body includes using a single casting mold to cast the case body as a single integral piece.

In addition to one or more of the features described above, or as an alternative to any of the foregoing embodiments, the case body includes machining the case body as a single integral piece from a single forging.

In addition to one or more of the features described above, or as an alternative to any of the foregoing embodiments, the case body includes a meshing bulb radially outboard from the HPT seal support with respect to the centerline axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
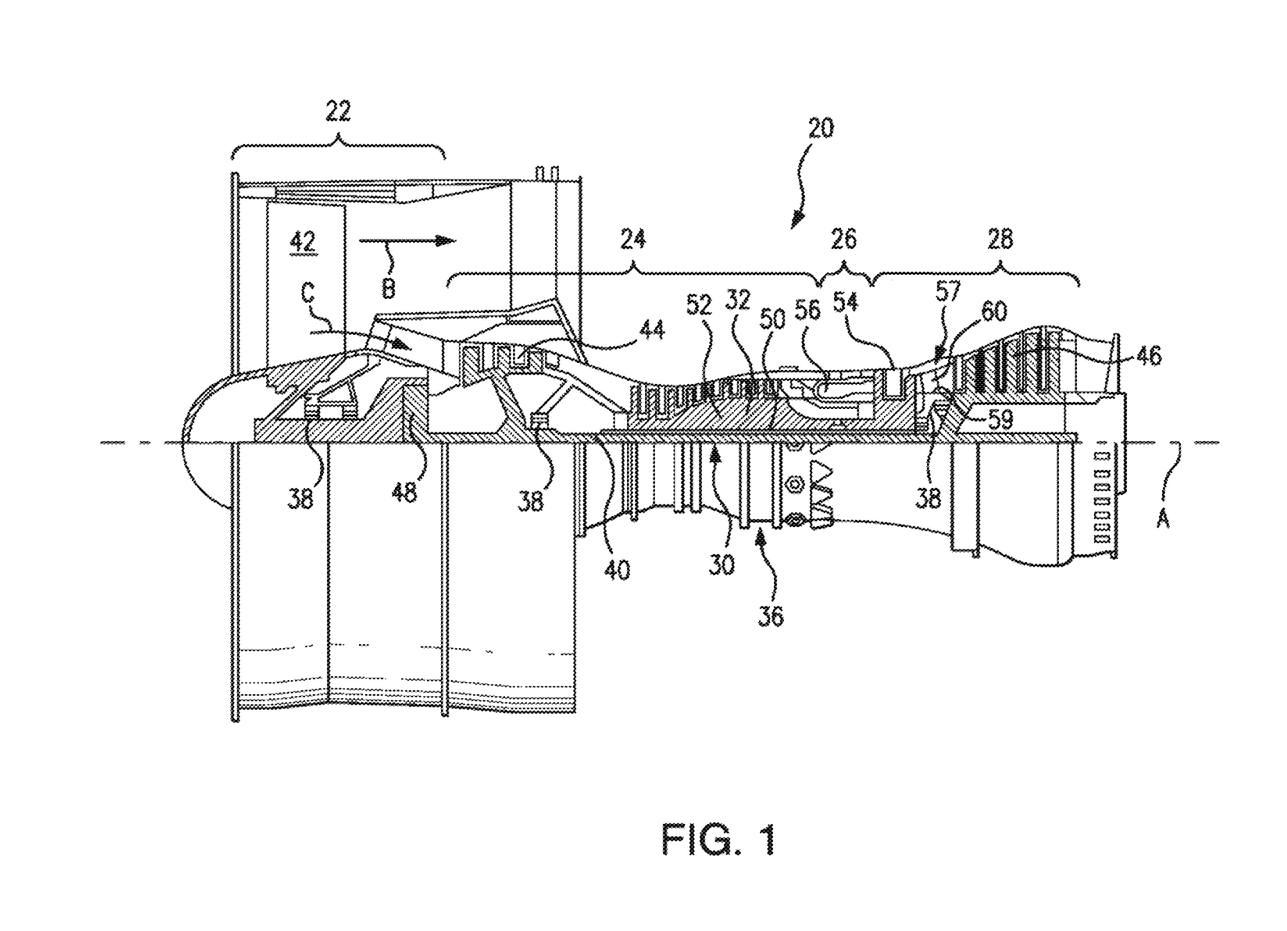
FIG. 1 is a schematic cross-sectional side elevation view of an exemplary embodiment of a gas turbine engine constructed in accordance with the present disclosure, showing the location of the mid-turbine frame.

Reference will now be made to the drawings wherein like reference numerals identify similar structural features or aspects of the subject disclosure. For purposes of explanation and illustration, and not limitation, a cross-sectional view of an exemplary embodiment of the gas turbine engine constructed in accordance with the disclosure is shown in FIG. 1 and is designated generally by reference character 20. Other embodiments of gas turbine engines constructed in accordance with the disclosure, or aspects thereof, are provided in FIGS. 2-5, as will be described.

As shown in FIG. 1, a gas turbine engine 20 is schematically shown. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

With continued reference to FIG. 1, the exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. Mid-turbine frame 57 includes an inner case 59 and supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second.

Figure 2:
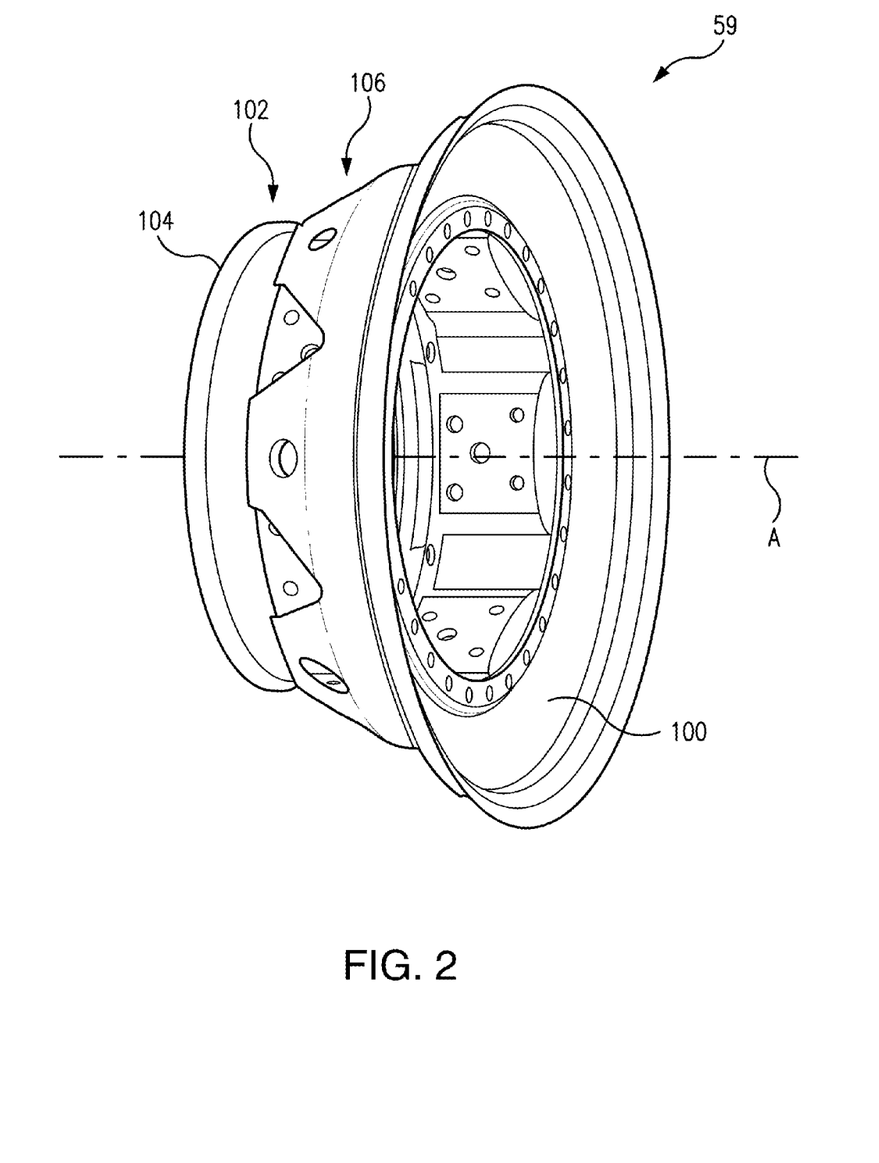
FIG. 2 is a perspective view of an exemplary embodiment of an inner case of the mid-turbine frame of the gas turbine engine of FIG. 1, showing the HPT seal support and an I-rod support.

Now with reference to FIG. 2, inner case 59 includes a case body 100. Case body 100 has a centerline axis that is co-axial with longitudinal axis A. Case body 100 may be a single integral piece that includes a high pressure turbine (HPT) seal support 102, a meshing bulb 104, and an I-rod support 106 downstream of meshing bulb 104 and HPT seal support 102. By casting or forging case body 100 as a single integral piece, instead of machining separate forgings and bolting, welding or using other attachment methods, a flange joint between HPT seal support and the I-rod support can be eliminated. This tends to reduce weight by eliminating parts and eliminates a potential leak path by removing the flange joint. Additionally, the load path for the majority of the forces acting on meshing bulb 104 can be optimized to travel into the I-rod support 106, instead of HPT seal support 102.

Figure 3:
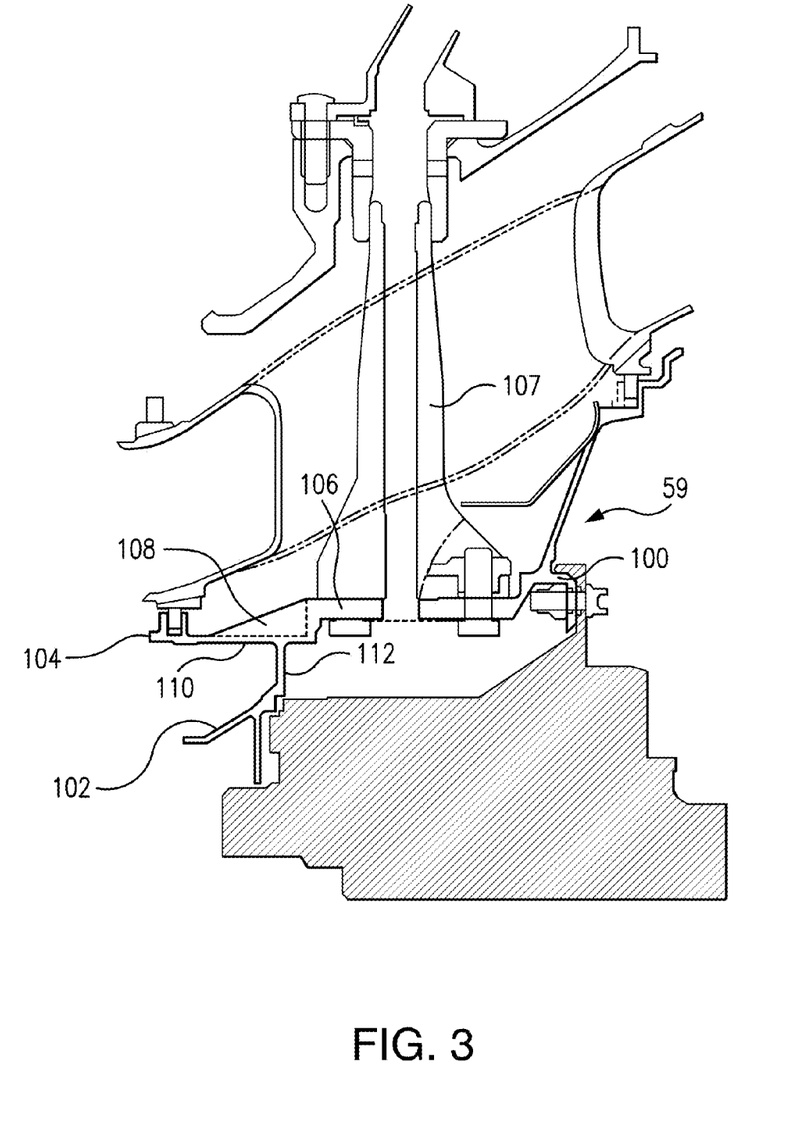
FIG. 3 is a schematic cross-sectional side elevation view of a portion of the inner case of FIG. 2, showing the HPT seal support and the I-rod support as an integral inner case.

As shown in FIG. 3, meshing bulb 104 is defined on the leading edge of case body 100 radially outboard from HPT seal support 102 with respect to longitudinal axis A. Meshing bulb 104 acts to resist axial movement in the aft direction of the HPT rotor, not shown. Case body 100 also includes a gusset 108 between meshing bulb 104 and I-rod support 106. I-rod support 106 is the portion of the case body where an I-rod 107 of the mid-turbine frame 57 is mounted. I-rod 107 extends radially outward from I-rod support 106 to support the bearing assembly 38. Gusset 108 is one of a plurality of circumferentially spaced apart gussets 108 axially defined between meshing bulb 104 and I-rod support 106. Gussets 108 help to support the axial loads transferred from meshing bulb 104.

Figure 6:
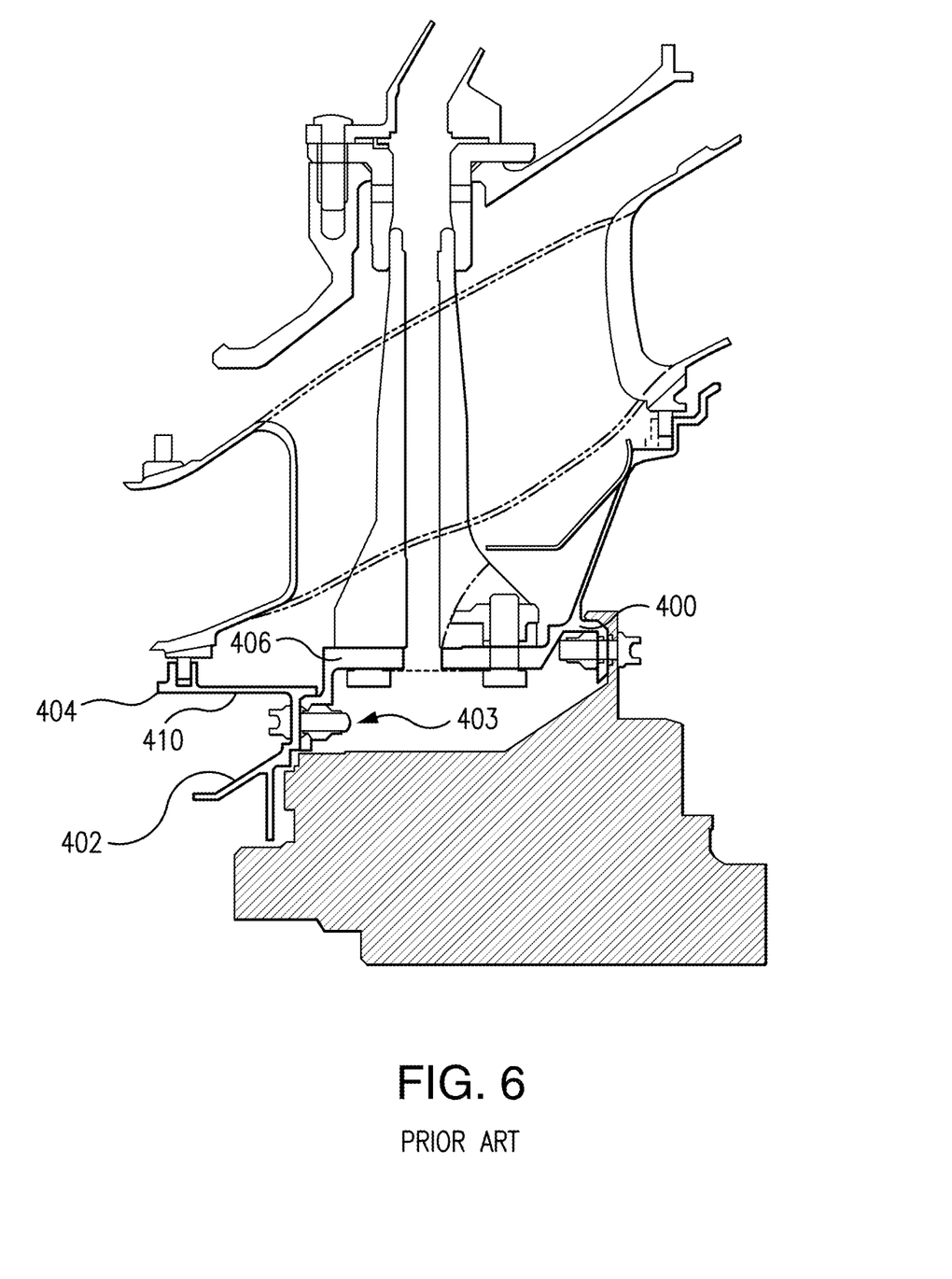
FIG. 6 is a schematic cross-sectional side elevation view of a portion of a traditional inner case.

With continued reference to FIG. 3, case body 100 includes an uninterrupted outboard flange 110 connecting meshing bulb 104 and I-rod support 106. Uninterrupted outboard flange 110 is radially outboard from HPT seal support 102. A load path is defined through meshing bulb 104, uninterrupted outboard flange 110, and I-rod support 106. Case body 100 also includes an uninterrupted inboard flange 112 connecting HPT seal support 102 and I-rod support 106. Uninterrupted inboard flange 112 is radially inboard from I-rod support 106. Uninterrupted outboard and inboard flanges 110 and 112, respectively, are each a single-ply of material, which reduces the overall case body 100 weight as compared with the bolted flange joint 403 of traditional mid-turbine frame inner cases, as shown in FIG. 6.

Figure 4:
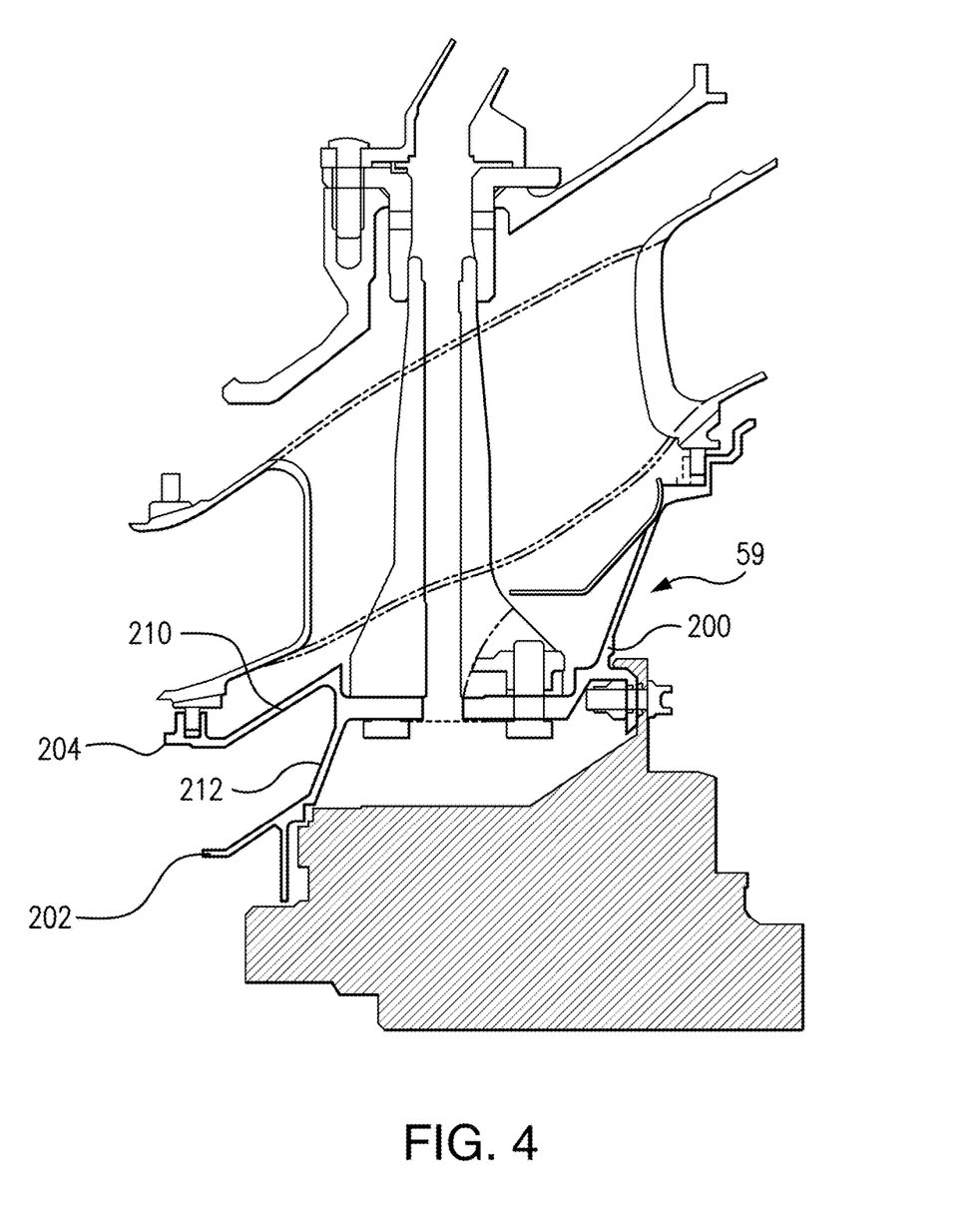
FIG. 4 is a schematic cross-sectional side elevation view of another embodiment of a portion of the inner case of FIG. 2, showing frustoconical uninterrupted inboard and outboard flanges.

As shown in FIG. 4, case body 200 is substantially the same as case body 100. Case body 200, however, does not include gussets 108. Instead, case body 200 includes an uninterrupted outboard flange 210 that is frustoconical and diverges in a direction away from HPT seal support 202, and an uninterrupted inboard flange 212 that is frustoconical and diverges in the same direction as uninterrupted outboard flange 210. Depending on the desired load path and capabilities, it is contemplated that uninterrupted outboard flange 210 can be frustoconical or cylindrical, similar to uninterrupted outboard flange 110, and it is also contemplated that uninterrupted inboard flange 212 can be frustoconical or can extend in a more radially outward direction, similar to uninterrupted outboard flange 112.

Figure 5:
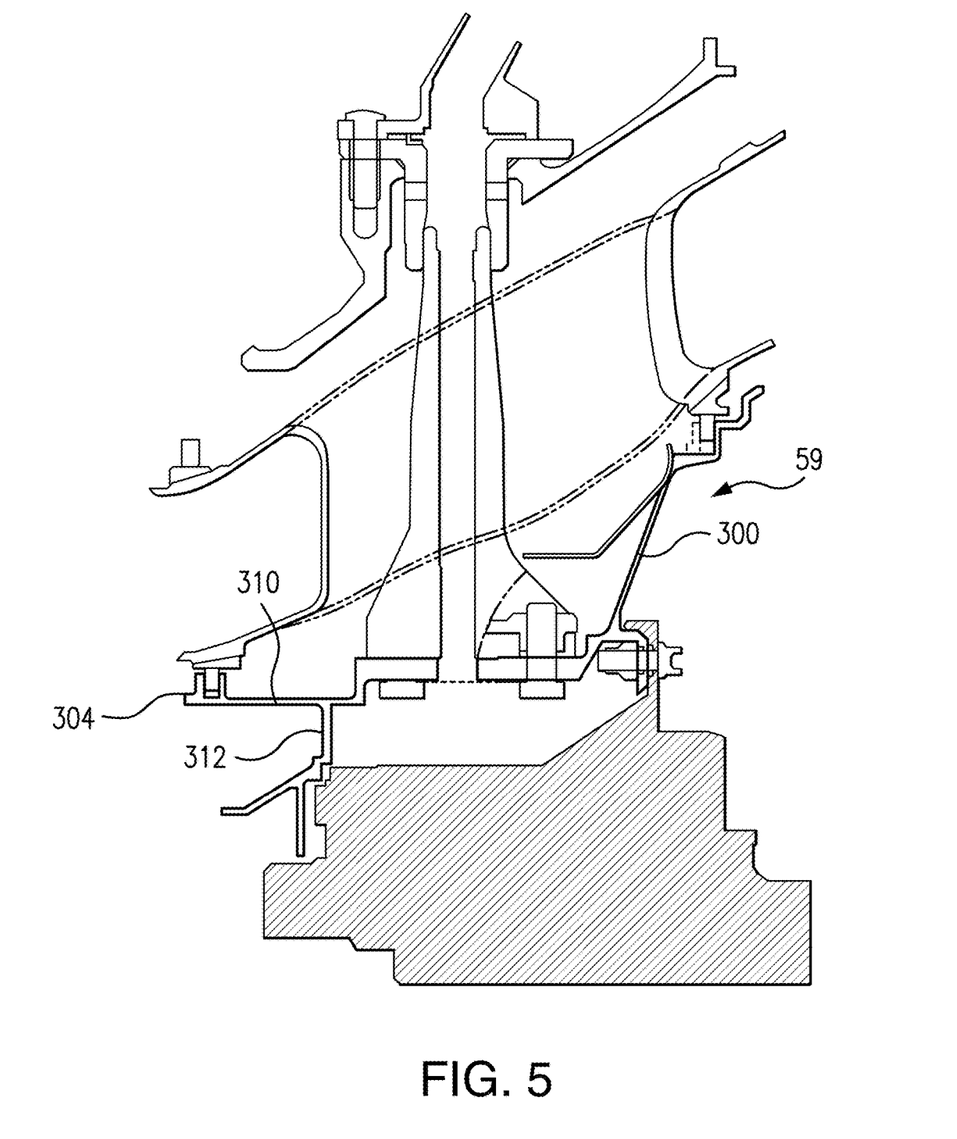
FIG. 5 is a schematic cross-sectional side elevation view of another embodiment of a portion of the inner case of FIG. 2, showing uninterrupted inboard and outboard flanges.

Now with reference to FIG. 5, another embodiment of a case body 300 is shown. Case body 300 is substantially the same as case body 100, except that case body 300 does not include gussets, e.g. gussets 108. If gussets are not required for a given application, they can be left off, further reducing the weight of case body 300.

A method for manufacturing an inner case, for example inner case 59, includes casting a case body, e.g. case bodies 100, 200, or 300, described above. Casting the case body includes casting the case body as a single integral piece using a single casting mold. Those skilled in the art will readily appreciate that casting the case body as an integral piece tends to increase casting complexity but can reduce the amount of post-cast precision machining required, as compared with the machining required for a traditional case body, e.g. case body 400 shown in FIG. 6. In addition, casting the case body as an integral piece can reduce the parts required, and can reduce assembly and inspection time, as compared with the traditional case body 400 of FIG. 6. It is also contemplated that the case body can be machined from a forging. Whether the case body is casted or forged depends on the structural design requirements and the expected loading on the case body.

The methods and systems of the present disclosure, as described above and shown in the drawings, provide for inner cases with superior properties including reduced weight, cost and assembly time. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An inner case for a gas turbine engine comprising:
a case body defining a centerline axis including:
a turbine seal support;
an I-rod support downstream of the turbine seal support;
a meshing bulb radially outboard from the turbine seal support with respect to the centerline axis; and
a gusset between the meshing bulb and the I-rod support.

2. An inner case as recited in claim 1, wherein the case body includes an uninterrupted outboard flange connecting the meshing bulb and the I-rod support, wherein the uninterrupted outboard flange is radially outboard from the turbine seal support, and wherein a load path is defined through the meshing bulb, the uninterrupted outboard flange, and the I-rod support.

3. An inner case as recited in claim 2, wherein the uninterrupted outboard flange is a single-ply of material.

4. An inner case as recited in claim 1, wherein the case body includes an uninterrupted outboard frustoconical flange connecting the meshing bulb and the I-rod support, wherein the uninterrupted outboard frustoconical flange diverges in a direction away from the turbine seal support.

5. An inner case as recited in claim 1, wherein the case body includes an uninterrupted inboard flange connecting the turbine seal support and the I-rod support, wherein the uninterrupted inboard flange is radially inboard from the I-rod support.

6. An inner case as recited in claim 5, wherein the uninterrupted inboard flange is a single-ply of material.

7. An inner case as recited in claim 1, wherein the case body includes an uninterrupted inboard frustoconical flange connecting the turbine seal support and the I-rod support, wherein the uninterrupted inboard frustoconical flange diverges in a direction away from the turbine seal support.

8. An inner case as recited in claim 1, wherein the case body is a single integral piece.

9. An inner case as recited in claim 1, wherein the case body is manufactured by casting the case body as a single integral piece using a single casting mold.

10. An inner case as recited in claim 1, wherein turbine seal support is a high pressure turbine seal support.

11. An inner case for a gas turbine engine comprising:
a case body defining a centerline axis including:
a turbine seal support;
an I-rod support downstream of the turbine seal support;
a meshing bulb radially outboard from the turbine seal support with respect to the centerline axis; and
a plurality of circumferentially spaced apart gussets axially defined between the meshing bulb and the I-rod support.

12. A mid-turbine frame for a gas turbine engine comprising:
an inner case having an integral case body defining a centerline axis, the case body including:
a turbine seal support;
an I-rod support downstream of the turbine seal support;
a meshing bulb radially outboard from the turbine seal support with respect to the centerline axis; and
a gusset between the meshing bulb and the I-rod support.

13. A mid-turbine frame as recited in claim 12, wherein the case body is manufactured by casting the case body as a single integral piece using a single casting mold.

14. A method for manufacturing an inner case for a turbomachine with an integral high pressure turbine seal support, the method comprising:
fabricating a case body defining a centerline axis, wherein the case body includes:
a high pressure turbine seal support;
an I-rod support downstream of the high pressure turbine seal support;
a meshing bulb radially outboard from the high pressure turbine seal support with respect to the centerline axis; and
a gusset between the meshing bulb and the I-rod support.

15. A method as recited in claim 14, wherein fabricating the case body includes using a single casting mold to cast the case body as a single integral piece.

16. A method as recited in claim 14, wherein fabricating the case body includes machining the case body as a single integral piece from a single forging.

* * * * *